US007502637B2

(12) United States Patent
Mori

(10) Patent No.: US 7,502,637 B2
(45) Date of Patent: Mar. 10, 2009

(54) MOBILE TERMINAL

(75) Inventor: Shinichiro Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 478 days.

(21) Appl. No.: 10/773,463

(22) Filed: Feb. 9, 2004

(65) Prior Publication Data

US 2004/0229665 A1 Nov. 18, 2004

(30) Foreign Application Priority Data

Feb. 10, 2003 (JP) ............................. 2003-032468

(51) Int. Cl.
*H04Q 7/20* (2006.01)

(52) U.S. Cl. ............... 455/575.7; 455/575.3; 455/575.1

(58) Field of Classification Search ....................... None
See application file for complete search history.

(56) References Cited

U.S. PATENT DOCUMENTS

| | | | | |
|---|---|---|---|---|
| 5,146,231 | A * | 9/1992 | Ghaem et al. | 342/419 |
| 5,649,306 | A | 7/1997 | Vannatta et al. | |
| 5,714,937 | A * | 2/1998 | Campana, Jr. | 340/573.1 |
| 5,940,040 | A | 8/1999 | Koyanagi et al. | |
| 5,991,643 | A | 11/1999 | Chao-Cheng | |
| 2002/0094789 | A1 | 7/2002 | Harano | |
| 2002/0113743 | A1* | 8/2002 | Judd et al. | 343/757 |
| 2003/0013470 | A1 | 1/2003 | Forrester | |
| 2004/0046694 | A1* | 3/2004 | Chiang et al. | 342/360 |

FOREIGN PATENT DOCUMENTS

| | | | |
|---|---|---|---|
| CN | 1123476 | A | 5/1996 |
| EP | 1 237 289 | A2 | 9/2002 |
| GB | 2 327 572 | A | 1/1999 |
| JP | 62-038377 | | 2/1987 |
| JP | 04-014329 | | 1/1992 |
| JP | 2001-102830 | | 4/2001 |
| JP | 2002-064314 | | 2/2002 |
| JP | 2002-118411 | | 4/2002 |
| JP | 2002-158526 | | 5/2002 |
| JP | 2002-171190 | | 6/2002 |
| JP | 2002-171191 | | 6/2002 |
| JP | 2002-223185 | | 8/2002 |
| JP | 2002-261679 | | 9/2002 |
| JP | 2002-368850 | | 12/2002 |
| WO | WO 98/39817 | | 9/1998 |

OTHER PUBLICATIONS

Communication including a Partial European Search Report from the European Patent Office dated Jun. 4, 2004 in connection with the corresponding European Patent Application.

Communication including Search Report from the European Patent Office dated Aug. 12, 2004 in the corresponding European Patent Application.

Office Action issued from SIPO dated Dec. 10, 2004, with regard to the corresponding Chinese Patent Application No. 200410004869.X.

Japanese Notice of Reason for Rejection mailed Feb. 20, 2007 in corresponding Japanese Patent Application No. 2003-032468 (3 pages).

Notice of Reasons for Rejection in corresponding Japanese Patent Application No. 2003-032468, dated Nov. 7, 2006.

Final Decision of Rejection issued Dec. 11, 2007 in the corresponding Japanese Patent Application No. 2003-032468 (2 pages with 3 pages of English translation).

* cited by examiner

*Primary Examiner*—Erika A Gary
(74) *Attorney, Agent, or Firm*—Staas & Halsey LLP

(57) ABSTRACT

There are provided a first antenna as a omnidirectional antenna, a second antenna as directional antenna and a switching unit for switching over the antenna for receiving.

5 Claims, 7 Drawing Sheets

UPPER SURFACE
LOWER SURFACE

MOBILE TERMINAL

CROSS REFERENCE TO RELATED APPLICATION

This application is based upon and claims the benefit of priority under 35 U.S.C. § 119 from prior Japanese Patent Application No. 2003-032468, filed Feb. 10, 2003.

BACKGROUND OF THE INVENTION

The invention relates to a mobile terminal that captures a position by utilizing satellites for GPS (Global Positioning System).

The GPS is a system for deducing a present precise position from pieces of information on a trajectory and a time by receiving radio waves transmitted from a plurality of artificial satellites orbited at an altitude of approximately 20,000 km in the sky.

At the present, the GPS is utilized in a great variety of fields ranging from a car navigation system for an automobile to a location survey technology.

As this type of technology, there is a satellite navigation system, as well as being a antenna device used for a car navigation utilizing the GPS. The satellite navigation system for detecting multipass waves by using a dextrorotatory circularly polarized wave antenna and a levorotatory circularly polarized wave antenna and by comparing an output level of the dextrorotatory circularly polarized wave antenna with an output level of the levorotatory circularly polarized wave antenna.

Further, the GPS is used to get position information when doing emergency call by the cellular phone.

For example, in the event of dialing emergency call to the police by utilizing the cellular phone, the police side grasps neither where the cellular phone is located nor where an accident happens, accordingly. Therefore, this might cause a hindrance on the occasion that the policeman is dispatched to the accident spot. For obviating this problem, there is a system for utilizing the GPS for the emergency call by a contrivance that the cellular phone can notify of its positional information.

Moreover, in addition to the emergency call, there will be provided other portable navigation services utilizing the positional information, such as displaying a restaurant closest to a position where the user himself or herself exists, and so on.

In a case where the cellular phone has a built-in GPS function, however, a position of installing the antenna can not be fixed unlike the automobile. Namely, the cellular phone is unable to keep a fixed direction, and hence the antenna built in the cellular phone points in unspecified directions.

Accordingly, the antenna of the cellular phone does not necessarily receive the radio waves from the GPS satellite in a preferable position and a preferable direction.

Therefore, in case a person carries the cellular phone while attaching it to the waist, there is an instance of measuring the position with the cellular phone attached to the shoulder by separating the antenna unit.

Given herein is an explanation of types of the antennas.

A patch antenna is given as what is typical of the GPS antenna. This patch antenna has, as shown in FIG. 6, directional only in an upper adverse side direction, and is capable of receiving the waves directly from the satellite with a high sensitivity.

Further, a chip antenna is typical of the antenna for the cellular phone. This chip antenna has a radiation pattern that, as illustrated in FIG. 7, spreads in all directions. Moreover, the chip antenna is extremely small-sized. Therefore, the chip antenna is excellent as the antenna for the cellular phone and is capable of receiving the GPS radio waves and the waves for communications of the cellular phone without changing the antenna.

SUMMARY OF THE INVENTION

In the prior arts described above, however, if the omnidirectional antenna such as the chip antenna is attached to the human body, the radiation pattern of the antenna changes due to an influence by the human body. The omnidirectional antenna is attracted to the human body, resulting in a decline of the receiving sensitivity of the antenna. Further, if the directional antenna like the patch antenna is attached to the human body, the directivity is though small of the influence by the human body. But the directivity of the directional antenna is strong, and it can receive only the radio waves from the satellites in specified directions.

The invention was made in view of these problems of the prior art. Namely, the invention solves the problems by providing architecture of an antenna for a mobile terminal that reduces the influence by the human body.

The invention adopts the following means in order to solve the problems.

A mobile terminal according to the invention is characterized by comprising a first antenna as a omnidirectional antenna, a second antenna as directional antenna, and a switching unit for switching over the receiving antenna.

With this architecture, on the mobile terminal with its installing position unfixed, the switching unit can switch over the receiving antenna. And hence the mobile terminal can receive radio waves in a preferable state.

Further, the mobile terminal according to the invention may further comprise a printed circuit board mounted with the first antenna and the second antenna, a first box body holding the printed circuit board, and a second box body rotatably secured to the first box body, wherein the first antenna may be provided in the vicinity of a front edge portion on the side opposite to the securing side of the first box body on the printed circuit board, and the second antenna may be provided on a flip side of the adverse side facing the second box body on the printed circuit board when the first box body and the second box body are folded together.

Moreover, the switching unit may switch over the receiving antenna to the second antenna in a case where the first box body and the first box body are in a folded state, and may switch over the receiving antenna to the first antenna in an unfolded state.

With this architecture, a user of this mobile terminal uses the mobile terminal by setting it in the unfolded state and holding the second box body. At this time, the omnidirectional antenna is retained on the side opposite to the securing side between the first box body and the second box body, i.e., in a position apart from the human body on the printed circuit board within the first box body. Accordingly, when the mobile terminal is unfolded state (an opened state), the omnidirectional antenna is used apart from the human body and is therefore employed in a state of being less influenced by the human body. Consequently, the omnidirectional antenna can acquire a sufficient receiving sensitivity for measuring a position.

Further, the directional antenna, when prompting the user to set the direction pattern so as to face outwards against the human body, can receive less of the influence by the human body. Hence, the directional antenna can acquire the sufficient receiving sensitivity for measuring the position even when the mobile terminal is in the folded state (a closed state). Moreover, the switching unit, when a specified receiving sensitivity is not obtained during a receipt by the first antenna, may switch over to the receipt by the second antenna.

With this architecture, when the mobile terminal is in the unfolded state (the opened state) and when the receiving sensitivity of the omnidirectional antenna is equal to or lower than the specified one, the mobile terminal utilizes the directional antenna. This is a case such as pressing the open adverse side against the human body in the state where the mobile terminal is unfolded. At this time, the radiation pattern of the directional antenna is directed on the opposite side to the human body. And hence the directional antenna can obtain the sufficient receiving sensitivity for measuring the position.

As explained above, the invention can provide the architecture of the antenna for the mobile terminal, which reduces the influence by the human body.

DETAILED DESCRIPTION OF THE INVENTION

A preferred embodiment of the invention will hereinafter be explained with reference to the drawings.

<Preferred Embodiment>

An embodiment in which the invention is applied to a folding type cellular phone will be described on the basis of FIGS. 1 through 4.

Figure 1:
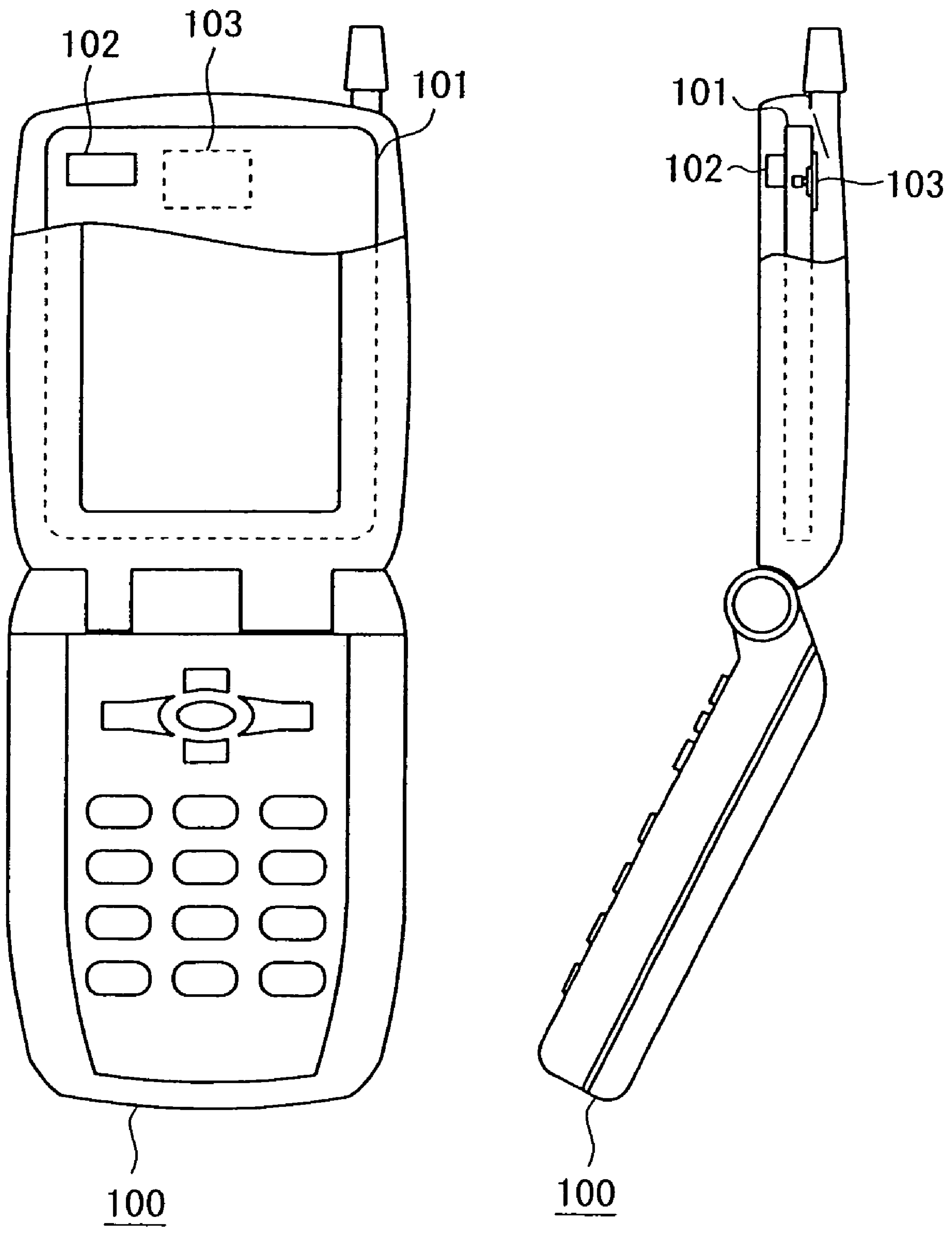
FIG. 1 shows a configuration of a folding type cellular phone.
Figure 2:
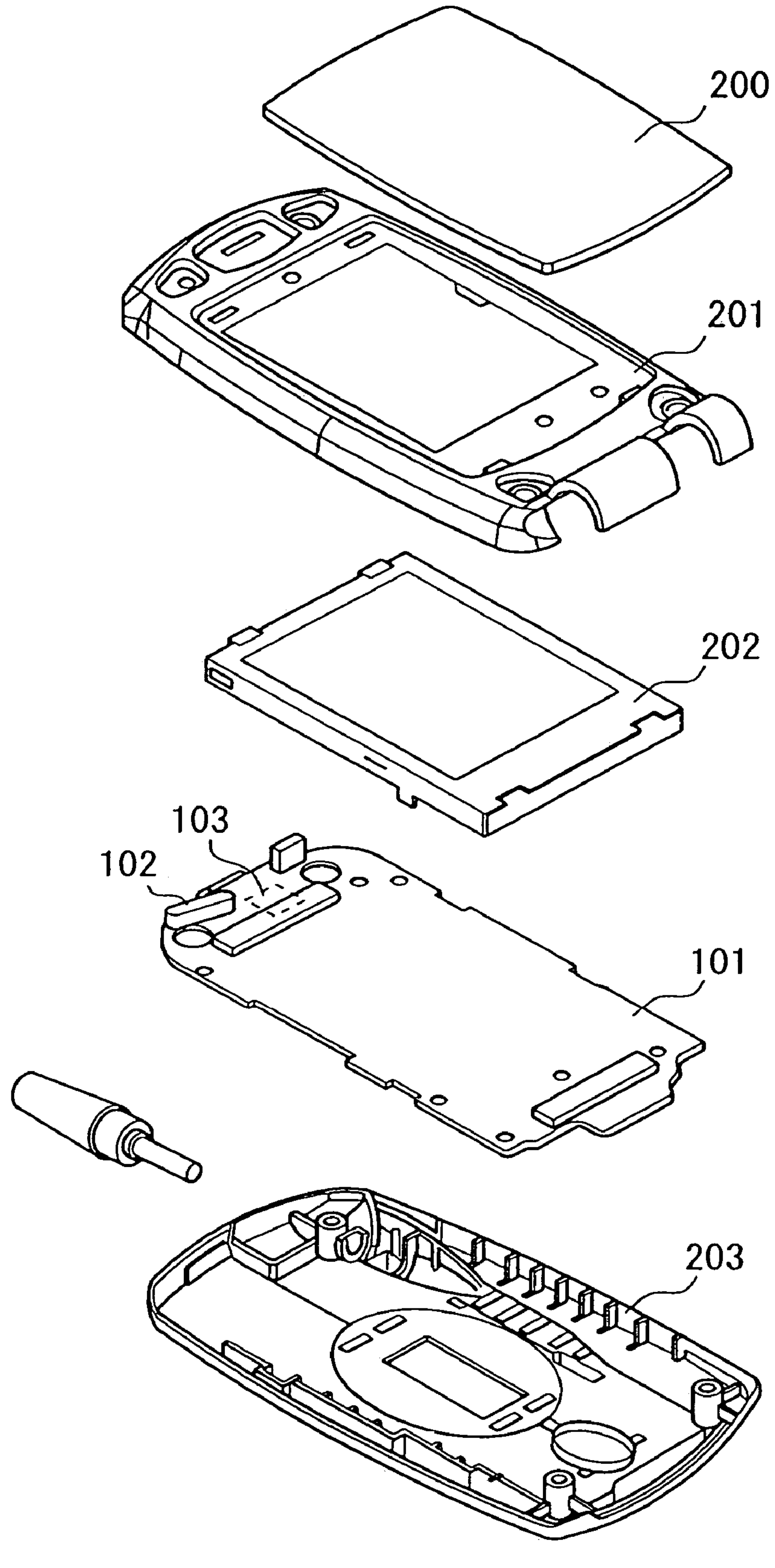
FIG. 2 is a development elevation of principal units of the folding type cellular phone.
Figure 3:
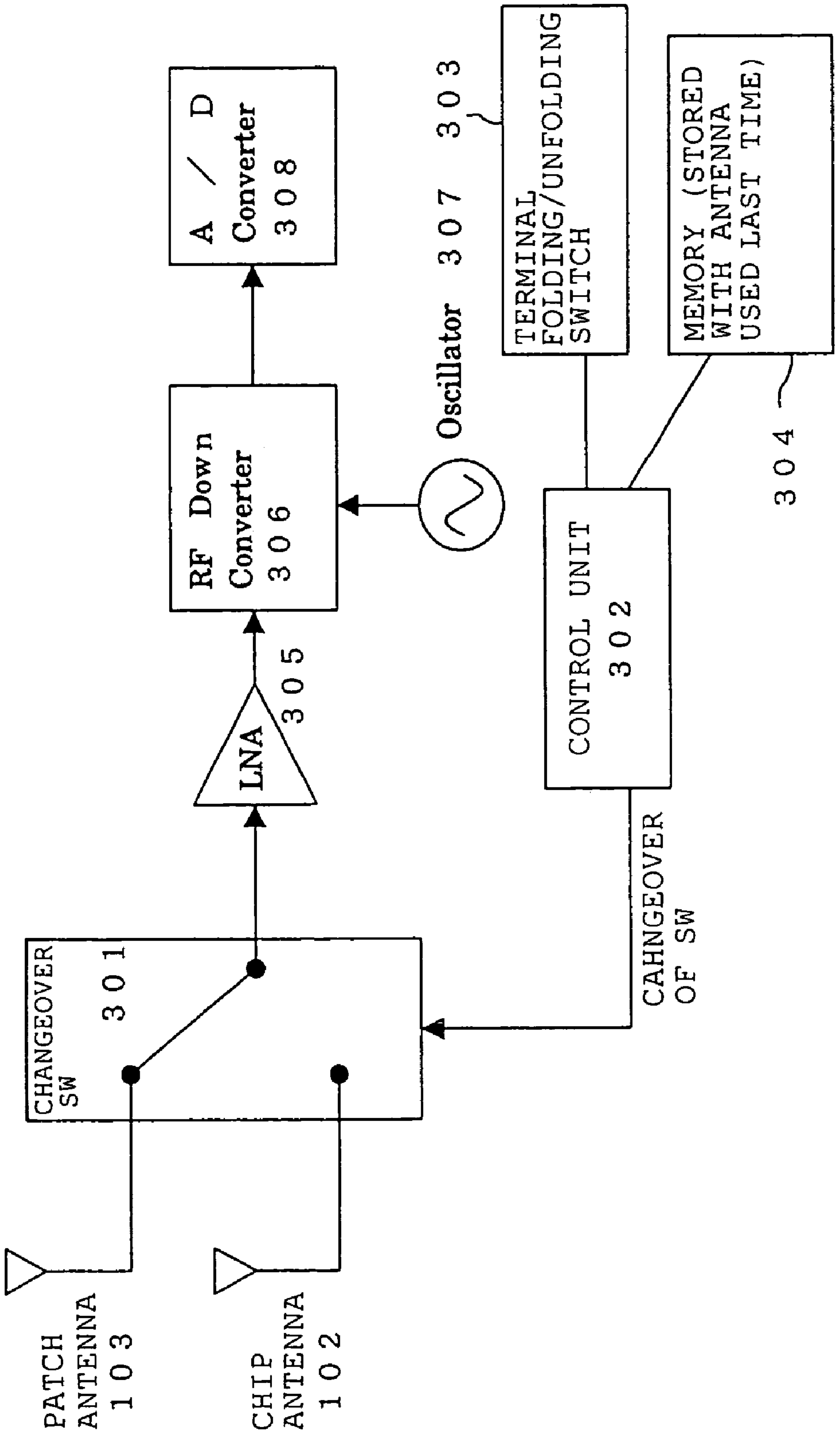
FIG. 3 is a circuit diagram of the cellular phone.
Figure 4:
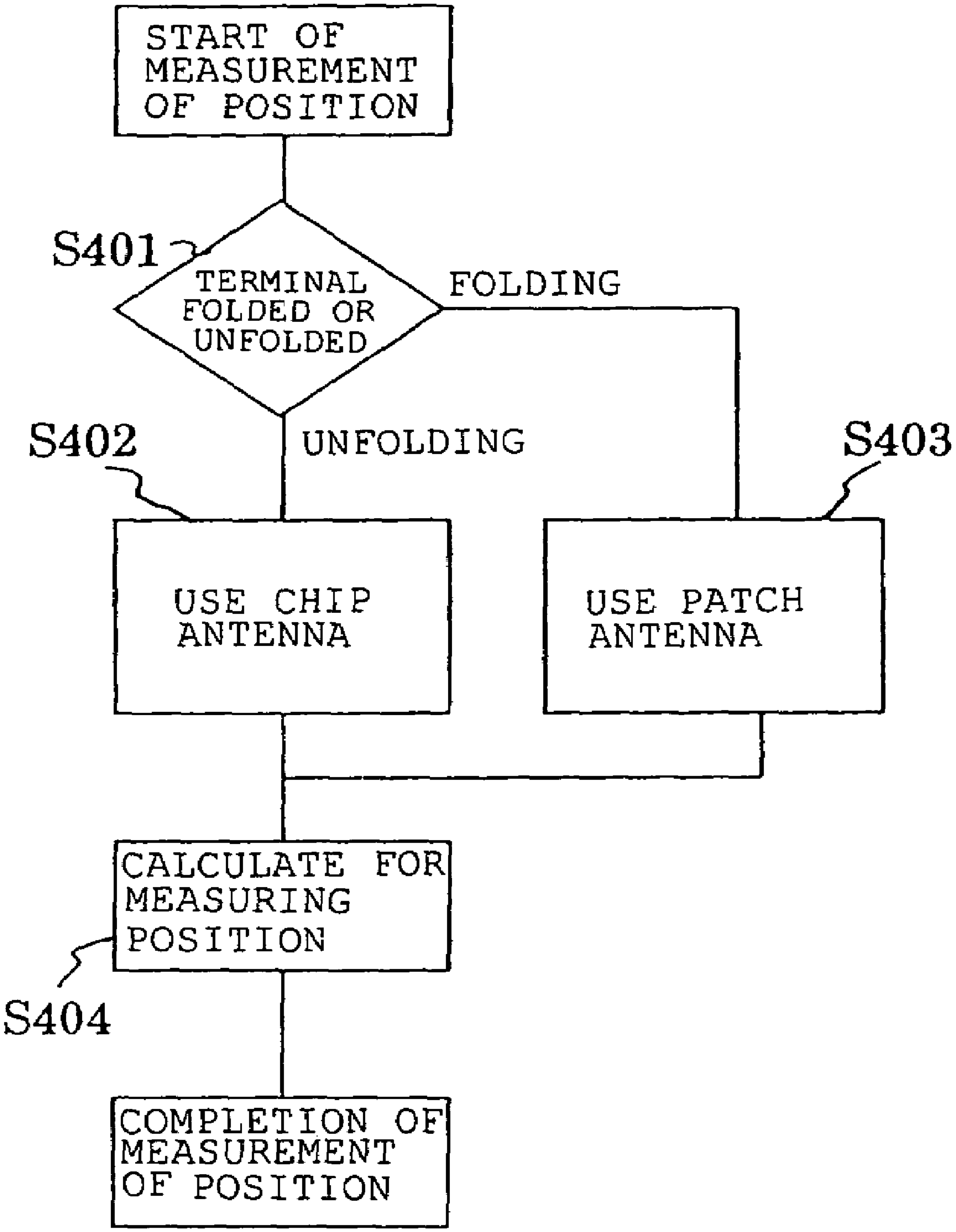
FIG. 4 shows a flow chart for processing of a changeover switch.

FIG. 1 is a view showing architecture of the folding type cellular phone, FIG. 2 is a development elevation of principal units of the folding type cellular phone, FIG. 3 is a circuit diagram of the folding type cellular phone, and FIG. 4 shows a flow chart for processing of a changeover switch.

<Architecture of Device>

Architecture of the folding type cellular phone will be explained referring to FIGS. 1 and 2.

As illustrated in FIG. 1, the cellular phone in the embodiment has a structure that a display body including a display unit such as a liquid crystal display, etc. is arrayed. Further, this cellular phone has a structure that an operation-unit-sided main body on which keys such as presses buttons, etc. is arrayed. Then, the display body and operation-unit-sided main body are secured rotatable through a hinge.

As shown in FIG. 1, a printed circuit board 101 exists on the display side of a folding type cellular phone 100. Then, a chip antenna 102 is provided on this printed circuit board 101 and on a front edge side opposite to the hinge side. Namely, the chip antenna 102 is provided so as to move away from a human body when unfolding the cellular phone.

The chip antenna 102 is lower in maximum receiving sensitivity by approximately 2 db-3 db than a patch antenna 103. Namely, the chip antenna 102 is preferable, disposed so as to be hard to receive an influence from the human body.

Normally, a person, when using the folding type cellular phone, operates the buttons, etc. in a handheld state. At this time, the front edge opposite to the hinge side of the cellular phone is located apart from the human body.

Therefore, when the folding type cellular phone is an unfolded state, the chip antenna 102 is disposed at the front end opposite to the hinge side of the cellular phone, whereby the antenna 102 can be disposed so as to be hard to receive the influence from the human body.

Accordingly, the chip antenna 102 can acquire a sufficient receiving sensitivity for measuring its position.

Further, the patch antenna 103 is provided on the flip side on the printed circuit board 101, i.e., on the adverse side opposite to the display side.

Figure 6:
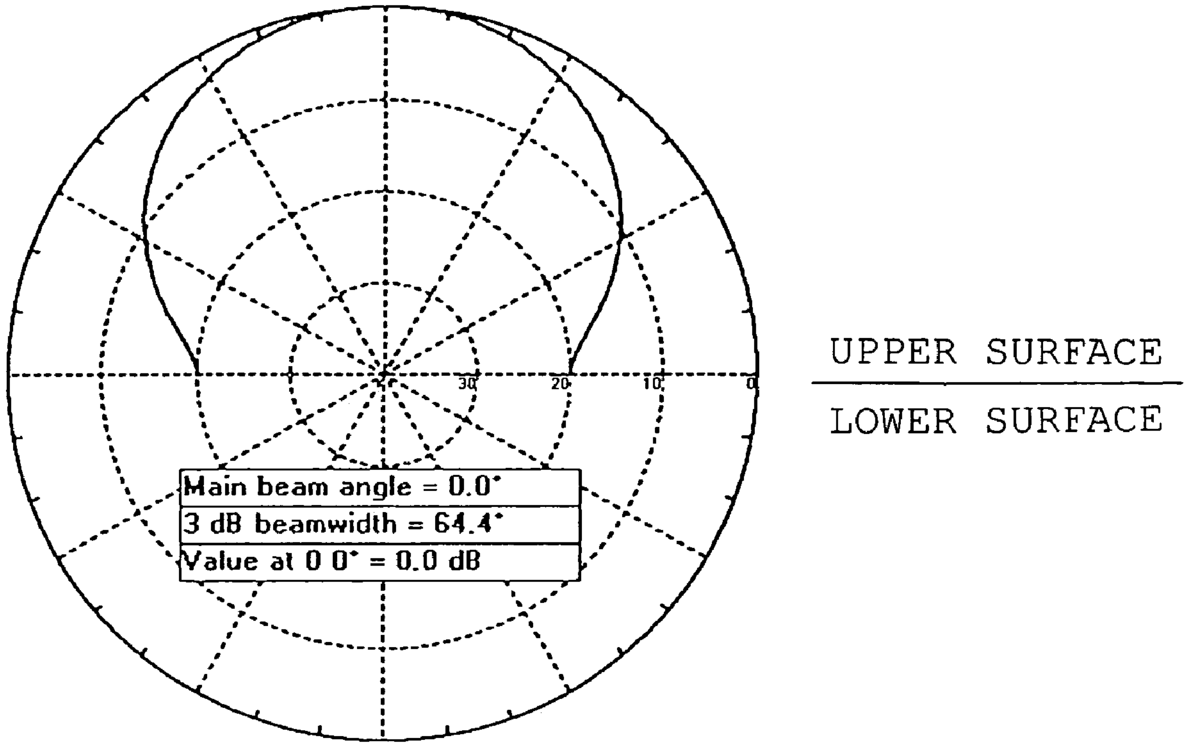
FIG. 6 is a diagram showing a typical characteristic of a patch antenna.
Figure 7:
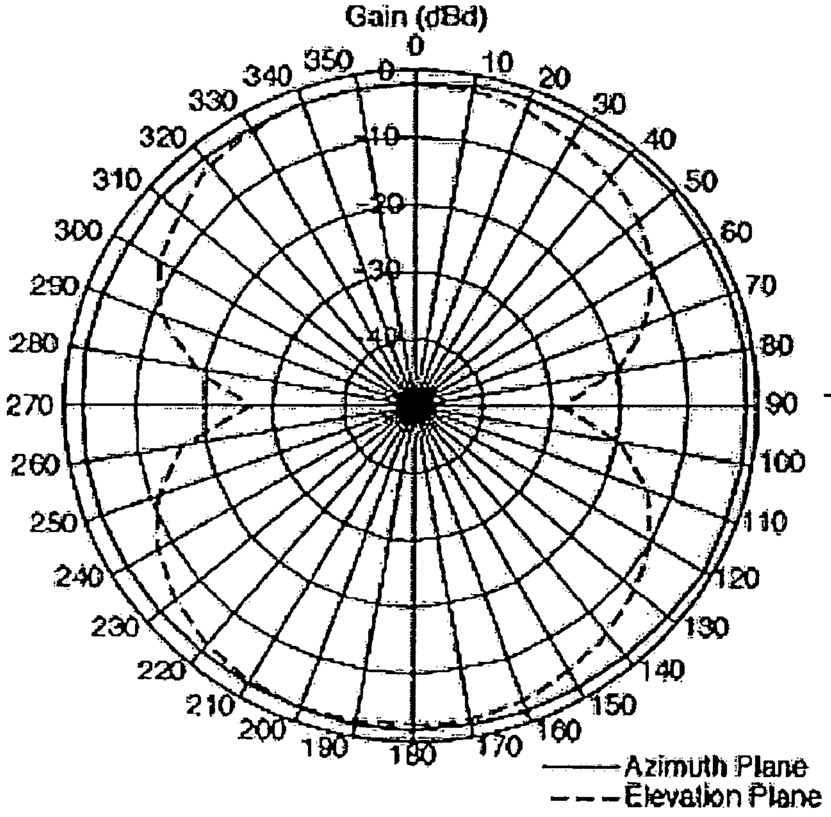
FIG. 7 is a diagram showing a typical characteristic of a chip antenna.

As shown in FIG. 1, the patch antenna 103 has a structure in which a flat plate is combined with a spindle-like member. Further, the patch antenna 103 has a directional in a direction of a normal line of the flat plate adverse side (a adverse side opposite to the joining adverse side to the spindle-like member) and in a direction wherein an elevation angle is approximately 15 or larger degrees with respect to the flat plate adverse side. This flat plate adverse side is an upper adverse side in FIG. 6, and a spindle-like member is joined to a lower adverse side in FIG. 6.

Disposing the patch antenna 103 in this way, when folding the cellular phone, a radiation pattern of the patch antenna 103 is directed outside of the cellular phone.

Then, it is possible to obtain the sufficient receiving sensitivity even when carrying the cellular phone, i.e., moving while carrying the cellular phone by prompting a user to set the radiation pattern in a direction opposite to the human body.

Further, when the cellular phone is in its unfolded state, the user uses the cellular phone in a way that makes the cellular phone close to the ear during a talk, and hence the receiving sensitivity of the chip antenna 102 declines.

In case the decline of the receiving sensitivity even in the unfolded state, the receiving antenna is switched over to the patch antenna 103 from the chip antenna 102. Then, in such case, the radiation pattern of the patch antenna 103 becomes directed outwards against the human body. Therefore, this cellular phone is able to reduce the influence from the human body.

Accordingly, the patch antenna 103 can acquire the sufficient receiving sensitivity.

FIG. 2 is the development elevation of the principal units of the folding type cellular phone including the printed circuit board 101, the chip antenna 102 and the patch antenna 103. These principal units are the principal units on the side of the movable-side main body, i.e., the display-side main body of the folding type cellular phone 100. Namely, a development elevation of the operation side is not illustrated, and its explanation is also herein omitted.

FIG. 2 shows, as the principal units, an LCD panel 200, and a movable side front case 201, an LCD module 202, a movable-side printed circuit board 101 and a rear case 203.

The LCD panel 200 is attached to an inner adverse side of the movable-side front case 201. The inner adverse side of the movable-side front case 201 is a adverse side on the side facing the operation-side main body when folding the cellular phone. One edge of the movable-side front case 201 is provided with a hinge so as to be rotatable about the operation-side main body. Further, the movable-side front case 201 is assembled with the rear case 203 to form the movable-side main body. The LCD module 202 and the movable-side printed circuit board 101 are so provided as to be sandwiched in between the movable-side front case 201 and the rear case 203. This LCD module has a function for displaying images and pictures on the display. Moreover, the movable-side printed circuit board 101 is provided with, as described above, the chip antenna 102 and the patch antenna 103.

<Construction of Circuit>

A construction of the circuit of the cellular phone will be explained referring to FIG. 3.

Note that the explanation given herein covers up to a conversion into a digital signal, starting from a receipt of an observation frequency band signal by the antenna. A process of deducing a present precise position from a trajectory contained in a signal converted into the digital signal and from time information, is well known to those skilled in the art, and hence its explanation is omitted.

To start with, the patch antenna (directional antenna) 103 having the directivity and the chip antenna (omnidirectional antenna) 102 having no directivity are connected to the changeover switch 301.

Then, whether to receive the signal from the patch antenna 103 or to receive the signal from the chip antenna 102, is changed over in accordance with an instruction of a control unit 302.

This control unit 302 is connected to a terminal folding/unfolding switch 303 and to a memory 304 stored with which antenna was used last time.

Herein, the terminal folding/unfolding switch 303 outputs signals related to folding/unfolding states of the cellular phone to the control unit. This terminal folding/unfolding switch 303 is a magnetic sensor utilizing, for example, a hall element. A magnet is provided on any one of the display-side main body and the movable-side main body, and the other is provided with the hall element.

Then, when the magnet comes into proximity to the Hall element, i.e., when the cellular phone is in the folded state, a voltage is generated in directions perpendicular to an electric current flowing across the Hall element and to a magnetic field generated by the magnet. A detection of this voltage makes it possible to detect that the cellular phone is in the folded state.

On the other hand, when the magnet gets away from the Hall element, viz., when the cellular phone is in the unfolded state, the Hall element does not receive any influence by the magnetic field. Hence almost no voltage is generated. In this case, the cellular phone is unfolded state.

Thus, the terminal folding/unfolding switch 303 is capable of detecting the folding/unfolding states of the cellular phone. Then, this detected signal is transferred to the control unit and utilized by the control unit on the occasion of judging whether the antenna is to be switched over.

The signal received by the patch antenna 103 or the chip antenna 102 is passed through the changeover switch 301 and transferred to a low noise amplifier 305 (Low Noise Amplifier which will hereinafter be abbreviated to LNA). The LNA 305 amplifies a feeble signal received by the antenna without adding noises to the greatest possible degree.

Next, this signal is transferred to a frequency converter (RF Down Converter) 306. Herein, if the transferred signal remains high of frequency, it is difficult to amplify and deal with the signal later on. Further, if a bandwidth rate of the transferred signal is increased too much by the same frequency, oscillations are easy to occur. Therefore, the frequency converter 306 converts the signal amplified by LNA 305 into an intermediate frequency band.

Then, the signal converted into the intermediate frequency band is transferred to an A/D converter 308. The A/D converter 308 converts an analog signal into a digital signal.

<Process of Changeover Switch>

FIG. 4 is given an explanation of a process of switching over the changeover switch 301, depending on whether the folding type cellular phone is folded or unfolded.

To begin with, the control unit 302 judges, based on the signal from the terminal folding/unfolding switch 303, whether the cellular phone is folded or unfolded (S401).

Herein, the control unit 302, in the case of judging that the cellular phone is unfolded, instructs the changeover switch 301 to receive by the chip antenna 102 (S402).

While on the other hand, the control unit 302, in the case of judging in S401 that the cellular phone is folded, instructs the changeover switch 301 to receive by the patch antenna 103 (S403).

Then, a central processing unit (CPU) makes a calculation of measuring the position on the basis of the digital signal (S404).

Thereafter, the control unit 302 terminates the processing.

<Modified Example>

In the embodiment discussed above, the changeover switch 301 performs switching depending on whether the folding type cellular phone is folded or unfolded. In a modified example, the changeover switch 301 is switched over depending on a receiving sensitivity.

Figure 5:
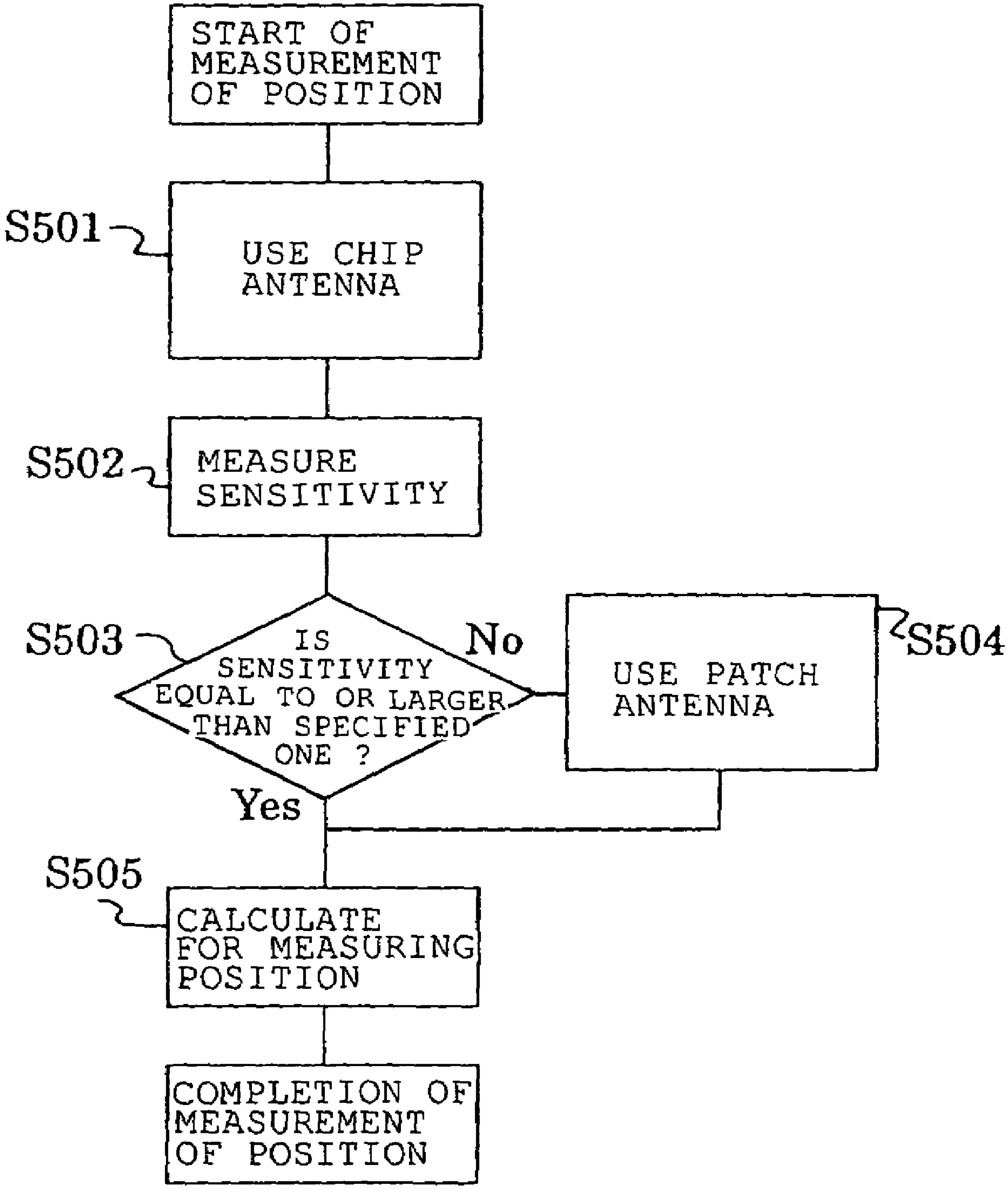
FIG. 5 shows a flow chart for processing of a changeover switch in the modified example.

FIG. 5 is a chart showing a processing flow of the changeover switch 301 in the modified example. A process of the changeover switch in the modified example will be described referring to FIG. 5.

At first, the chip antenna 102 is used as an antenna for receiving the observation frequency band signal (S501).

The control unit 302 measures a sensitivity of the received signal by use of the chip antenna (S502).

The control unit 302 judges whether or not the measured sensitivity is equal to or larger than a specified value (S503). The sensitivity being equal to or larger than the specified value implies a case where the number of artificial satellites that could receive the radio waves is equal to or larger than 4. Namely, in a case where a necessary number of radio waves for the calculation of measuring the position could be received, it may be deemed that the specified receiving sensitivity is obtained.

Herein, the control unit 302, in the case of judging that the sensitivity is not equal to or greater than the specified value, instructs the changeover switch 301 to receive by the patch antenna 103 (S504).

Then, the control unit 302 performs the calculation of measuring the position (S505).

While on the other hand, the control unit 302, in the case of judging in S503 that the sensitivity is equal to or greater than the specified value, directly performs the calculation of measuring the position (S505).

Thereafter, the control unit 302 terminates the processing.

<Other Modified Example>

In the embodiment described above, the terminal folding/unfolding switch 303 has been described as the magnetic switch involving the use of the Hall element. The embodiment of the invention is not, however, limited to this. For example, whether in the unfolded state or in the folded state may be detected by use of a mechanical switch.

Moreover, in the embodiment described above, the chip antenna 102 is provided on the side of the LCD panel 200, (on the adverse side facing the operation-side main body when the cellular phone is folded) on the opposite side to the patch antenna side (the flip side), on the printed circuit board 101. The embodiment of the invention is not, however, limited to this. For instance, the chip antenna 102 may be provided on the flip side of the printed circuit board 101 in the same way as the patch antenna 103 is provided.

In the modified example (FIG. 5) described above, the chip antenna 102 is initially employed as the receiving antenna, and, in the case where the receiving sensitivity is not equal to or greater than the specified value, there is made the changeover to the patch antenna 103. The patch antenna 103 may also be initially used as the receiving antenna, and, in the case where the receiving sensitivity is not equal to or greater than the specified value, there may be made the changeover to the chip antenna 102.

Note that the embodiment does not limit the scope of the invention at all, and a variety of modified modes are adequately possible within the range understandable to those skilled in the art.

As explained above, the invention can provide the architecture of the antenna for the mobile terminal, which reduces the influence by the human body.

What is claimed is:

1. A mobile terminal comprising:

a first antenna as an omnidirectional antenna;

a second antenna as directional antenna;

a switching unit for switching over the antenna for receiving;

a printed circuit board mounted with the first antenna and the second antenna;

a first body holding the printed circuit board; and a second body rotatably secured to the first body, wherein the first antenna is provided in a vicinity of a front edge portion on a side opposite to a securing side of the first body on the printed circuit board so as to keep the first antenna remote from a human body by extending the first body away from the securing side and away from the human body when the first body and the second body are unfolded and the second body is held in a hand of the human, and the second antenna is provided on a flip side of the side of the printed circuit board facing the second body when the first body and the second body are folded together so as to set a directional antenna pattern to face away from the human body when the mobile terminal is kept next to the human body in a folded state in which a flip side surface of the second body facing the first body also faces the human body.

2. The mobile terminal according to claim 1, wherein the switching unit switches over the receiving antenna, corresponding to whether the first body and the second body are in a folded state or in an unfolded state.

3. The mobile terminal according to claim 2, wherein the switching unit, in the case of the folded state, switches over the receiving antenna to the second antenna and, in the case of the unfolded state, switches over the receiving antenna to the first antenna.

4. The mobile terminal according to claim 1, wherein the switching unit switches over the receiving antenna in accordance with a receiving sensitivity.

5. The mobile terminal according to claim 4, wherein the switching unit, when a specified receiving sensitivity is not obtained during a receipt by the first antenna, switches over to the receipt by the second antenna.

* * * * *